United States Patent

McClellan

[11] Patent Number: 5,245,948
[45] Date of Patent: Sep. 21, 1993

[54] ANIMAL FEEDER WITH MOAT PROTECTION

[76] Inventor: Troy E. McClellan, 1708 N. Shannon St., Plant City, Fla. 33566

[21] Appl. No.: 840,112

[22] Filed: Feb. 24, 1992

[51] Int. Cl.$^5$ ............................ A01K 5/01; A01K 7/00
[52] U.S. Cl. ........................................ 119/51.5; 119/61
[58] Field of Search .................... 119/18, 51.1, 61

[56] References Cited

U.S. PATENT DOCUMENTS

| 1,718,432 | 6/1929 | Qualmann | 119/18 |
| 4,192,256 | 3/1980 | Clugston | 119/51.5 |
| 4,357,905 | 11/1982 | Carpenter | 119/51.5 X |

Primary Examiner—Robert P. Swiatek

[57] ABSTRACT

An animal feeder with moat protection having a center food section with the outer periphery thereof being of a height above the outer periphery of the feeder, and having a moat surrounding the food section, thereby preventing crawling insects, and ants, from contaminating the food in the food section, bugs and ants not being able to traverse the moat. A water supply section is affixed onto the outer periphery of the moat, sometimes being a part of the moat with the water supply section being more shallow than the moat so that the animal can drink all of the water in the water supply section while leaving water in the moat.

2 Claims, 1 Drawing Sheet

ANIMAL FEEDER WITH MOAT PROTECTION

BACKGROUND OF INVENTION

This invention relates to an apparatus and method of providing food to an animal, using a dish, and keeping the food portion of the dish protected from bugs, ants, and other insects, by a moat filled with water, and the water completely surrounding the food.

It has been customary to feed animals in a feeding dish, and to leave the food in the dish until the animal has finished the food. In some cases, it has been customary to feed the animals at a particular time of day, and the animal soon learns to anticipate this feeding time. If the food is left in the dish for a period of time, and, if there are crawling insects in the area, the insects will invade the food, and most animals will refuse to eat the invaded food.

Several approaches have been provided for keeping the food fresh, and free of these insects, but, with no real answer to the problem of the ants, and crawling insects. Whitty, in U.S. Pat. No. 3,853,096 teaches a continuous feeder for small animals containing pellet food; however, if left in an environment with crawling insects, this feeder would soon be infested with these insects.

Another approach is taught by Zammarano in U.S. Pat. No. 4,617,874, wherein a food container having a timing mechanism dispenses an amount of food to the animal at pre-determined times. Here, again, crawling insects can penetrate the food supply, causing the animal not to eat the food.

Still another approach to feeding animals over a period of time is taught by Cooper, in U.S. Pat. No. 3,532,075, wherein two separate compartments are taught, with a built in timing mechanism, with the intent of providing food to an animal over a period of time. Here, again, this teaching does not control the presence of the crawling insects, and ants, which contaminate the dish, and the food, and animals will refuse to eat the food.

SUMMARY OF THE INVENTION

Accordingly, it is an object of this invention to provide a new and improved apparatus and method for feeding animals over a period of time, and preventing the food from becoming contaminated with these crawling insects.

It is another object of this invention to provide a water supply for the animals attached onto, or being a part of the same dish, the water supply also serving as a moat around the food to keep the crawling insects from contaminating the food It is still another object of this invention to provide the water supply container area with a raised bottom portion, in order to make certain that the animal will not drink the water required for the moat, thereby still protecting the food from the crawling insects, and ants, after the water supply has been consumed by the animal.

In carrying out this invention in the illustrative embodiment thereof, an animal feeding dish, having three sections, the one section for containing a quantity of food for the animal, the other section being a moat encircling the food section of said dish, and the third section being a separate water receptacle for providing water to the animal.

Now, in operation, a quantity of food is placed in the food section of the dish. Now, a quantity of water is poured into the moat section of the dish, completely surrounding the food section of said dish. Also, a quantity of water is poured into the water receptacle section of the dish, thereby providing a quantity of food and water for the animal to last for a pre-determined length of time.

This animal feeding dish is constructed in a manner to keep a moat of water surrounding the food at all times. This is accomplished by the design of the dish, whereby the separate section for containing the supply of water for watering the animal is constructed more shallow in depth than the moat section, thereby allowing the animal to drink all of the water in the watering section of said dish, while assuring a supply of water in the moat section of said dish, even though the water supply in the watering section of said dish has been exhausted.

Conveniently, the owner may fill the animal feeding dish with a quantity of food for the animal to last over a predetermined length of time, then pour a quantity of water into the moat section of the dish, thereby also filling the watering section of the dish, thereby providing a constant supply of food and water to the animal over the predetermined time period, and allowing the food to remain protected from the many crawling insects and ants during the feeding time period desired.

BRIEF DESCRIPTION OF THE DRAWINGS

The invention, together with other objects, features, aspects and advantages thereof will be more clearly understood from the following description considered in conjunction with the accompanying drawings.

DESCRIPTION OF THE PREFERRED EMBODIMENTS

Figure 1:
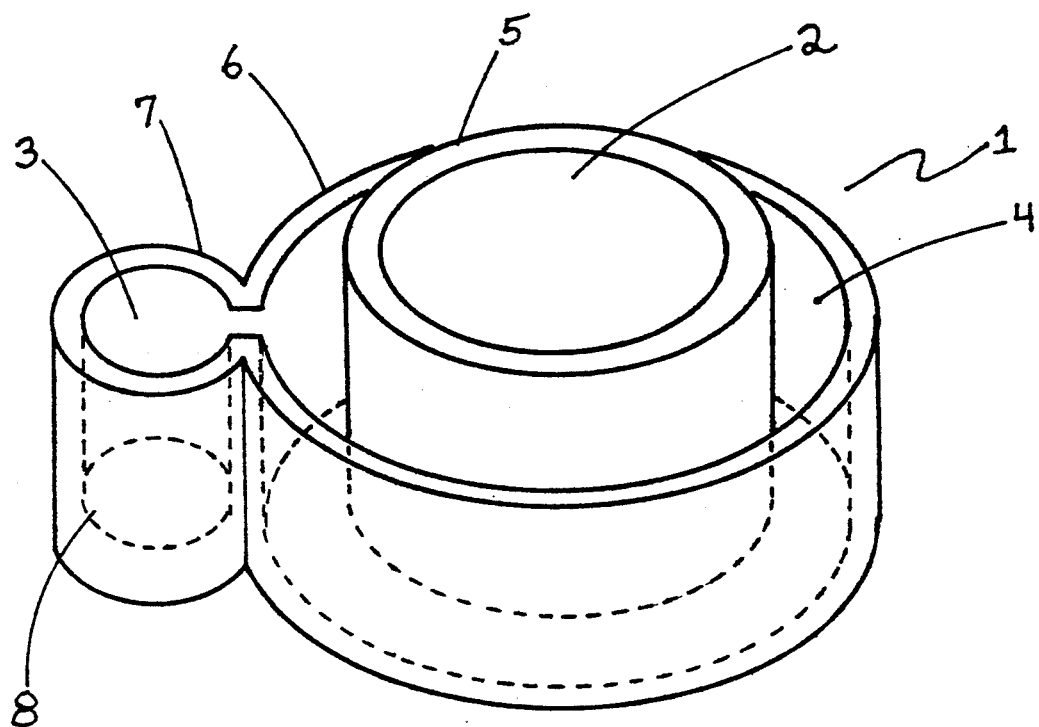
FIG. 1 is an isometric view of the animal feeding dish with moat, and separate watering section.

Referring now to FIG. 1, an animal feeder with moat protection, referred to generally by the reference numeral 1; is made of a suitable material, and is constructed in three sections, the food area 2, the watering area 3, and a moat area 4. As shown in FIG. 1, said food area 2 has a raised periphery over said moat area 4, thereby preventing water from said moat area 4 escaping into said food area 2, thusly contaminating said food area 2.

Figure 2:
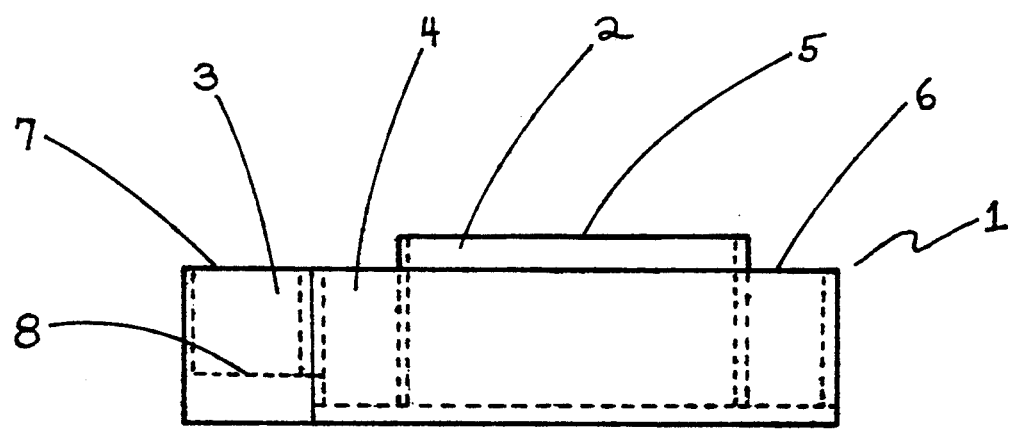
FIG. 2 is a side view of the animal feeding dish showing the raised bottom section of the animal watering section, and the raised edge of the food section.

Now, referring to FIG. 2, a separate watering section 3 has a raised bottom portion 8, thereby assuring a supply of water in said moat section 4, after all water has been exhausted from said watering section 3. Still referring to FIG. 2, raised food area 2, has a provision to prevent water contamination into food dish 5.

Now, referring again to FIG. 1, food is placed into food dish 5, and water is poured into moat enclosure 6, and water is supplied to water enclosure 7, thusly providing means for preventing the invasion of crawling insects into the food supply of the invention.

Accordingly, a very unique, attractive, convenient method and apparatus are provided for providing food to an animal for a pre-determined length of time, and preventing crawling insects, and ants from contaminating the food during said period of time.

Since minor changes and modifications varied to fit particular operating requirements and environments will be understood by those skilled in the art, the invention is not considered limited to the specific examples chosen for purposes of illustration, and includes all changes and modifications which do not constitute a departure from the true spirit and scope of this invention as claimed in the following claims and reasonable equivalents to the claimed elements.

What is claimed is:

1. A moated animal feeder for providing food to an animal for a predetermined length of time while preventing the contamination of the food by crawling insects, such as ants, said feeder comprising:
    (a) a substantially flat first bottom portion;
    (b) a continuous first upstanding wall integral with said first bottom portion and forming an enclosed feeding section for containing a supply of food;
    (c) a second upstanding wall surrounding said first wall and in concentric relation thereto such that a space is formed between said first and second walls, said second upstanding wall extending about the periphery of said first bottom portion and having a gap defined therein extending from said first bottom portion to an upper edge of said second wall;
    (d) a watering section integral with said second wall and extending outwardly therefrom in tangential relation thereto, said watering section having a sidewall and a second bottom portion and enclosing a volume smaller than that enclosed by said second upstanding wall, with opposed vertical edges of said watering section sidewall being connected to the opposed vertical edges of said second wall defining said gap and said second bottom portion being elevated above said first bottom portion whereby the space between the first and second walls functions as a moat when water is placed therein, and wherein water flows freely from said watering section to said aforementioned space when the water level in said space is below the elevation of said second bottom portion.

2. A moated animal feeder as recited in claim 1, wherein the height of the first wall exceeds that of said second wall to prevent water from entering said enclosed feeding section.

* * * * *